(12) United States Patent
Smith et al.

(10) Patent No.: US 9,367,849 B1
(45) Date of Patent: Jun. 14, 2016

(54) PACKAGING AUTHENTICATION

(71) Applicant: Owens-Brockway Glass Container Inc., Perrysburg, OH (US)

(72) Inventors: Roger P Smith, Perrysburg, OH (US); Jessica R Bryant, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 14/718,718

(22) Filed: May 21, 2015

(51) Int. Cl.
| | |
|---|---|
| G01T 1/04 | (2006.01) |
| G06Q 30/00 | (2012.01) |
| B65D 79/02 | (2006.01) |
| G01J 1/02 | (2006.01) |
| B65D 49/00 | (2006.01) |

(52) U.S. Cl.
CPC ............ *G06Q 30/0185* (2013.01); *B65D 49/00* (2013.01); *B65D 79/02* (2013.01); *G01J 1/02* (2013.01)

(58) Field of Classification Search
CPC .................................. G01J 1/02; B65D 49/00
USPC ............................................. 250/473.1, 372
See application file for complete search history.

(56) References Cited

U.S. PATENT DOCUMENTS

| | | | |
|---|---|---|---|
| 2,143,508 A | 1/1939 | Collens | |
| 2,515,936 A | 7/1950 | Armistead, Jr. | |
| 2,929,931 A | 3/1960 | Richter et al. | |
| 3,325,299 A | 6/1967 | Araujo | |
| 4,740,401 A | 4/1988 | Barkhan et al. | |
| 5,310,222 A | 5/1994 | Chatwin et al. | |
| 5,762,377 A | 6/1998 | Chamberlain | |
| 6,269,169 B1 | 7/2001 | Funk et al. | |
| 6,405,867 B1 | 6/2002 | Moore | |
| 6,786,614 B2 | 9/2004 | Ciarrocchi, Jr. | |
| 7,041,392 B2 | 5/2006 | Nakazawa et al. | |
| 7,044,614 B2 | 5/2006 | Levy et al. | |
| 7,253,422 B2 | 8/2007 | Smith | |
| 7,357,967 B2 | 4/2008 | Osika et al. | |
| 7,436,499 B2 | 10/2008 | Hiltner et al. | |
| 7,705,734 B2 | 4/2010 | Martinelli | |
| 7,927,688 B2 | 4/2011 | Abrams et al. | |
| 8,212,226 B2 | 7/2012 | Chisholm | |
| 8,830,076 B2 | 9/2014 | Smith et al. | |
| 2002/0079692 A1 | 6/2002 | Pennaz | |
| 2003/0063460 A1 | 4/2003 | Nadel | |
| 2003/0080193 A1 | 5/2003 | Ryan et al. | |
| 2004/0000787 A1 | 1/2004 | Vig et al. | |
| 2005/0024955 A1 | 2/2005 | Brosow | |
| 2005/0116465 A1 | 6/2005 | Muscat | |

(Continued)

FOREIGN PATENT DOCUMENTS

WO          WO 00/54985          9/2000

*Primary Examiner* — David Porta
*Assistant Examiner* — Meenakshi Sahu (57) ABSTRACT

An authentication system including a package that includes a container and a closure, an ultraviolet (UV) protector carried by the container, and a UV light responder carried by the container so that at least a portion thereof is protected by the protector from premature exposure to UV light. After removal of the UV light protector, the UV light responder is responsive to a predetermined schedule of UV light exposure so as to change in visual appearance within a predetermined time. The predetermined schedule may include a predetermined wavelength of UV light applied in a predetermined amount and over a predetermined application time. A related apparatus and authentication method are also disclosed.

20 Claims, 4 Drawing Sheets

(56) References Cited

U.S. PATENT DOCUMENTS

| | | |
|---|---|---|
| 2006/0139928 A1 | 6/2006 | Griffiths et al. |
| 2008/0121816 A1 | 5/2008 | Ellig |
| 2008/0149584 A1 | 6/2008 | Martinelli |
| 2008/0198014 A1 | 8/2008 | Vogt et al. |
| 2008/0272916 A1 | 11/2008 | Breysse et al. |
| 2008/0309497 A1 | 12/2008 | Bryant |
| 2009/0166427 A1 | 7/2009 | Chambers |
| 2009/0284732 A1 | 11/2009 | Vitale |
| 2010/0245044 A1 | 9/2010 | Dietemann |
| 2011/0140004 A1 | 6/2011 | Decroupet et al. |
| 2012/0168333 A1 | 7/2012 | Mackay et al. |
| 2014/0008441 A1 | 1/2014 | Huynh |
| 2014/0138274 A1* | 5/2014 | Smith .................... B65D 49/00 206/459.1 |
| 2014/0263158 A1 | 9/2014 | Whitton et al. |

\* cited by examiner

PACKAGING AUTHENTICATION

This patent application discloses innovations to packaging authenticity and, more particularly, to authenticity of containers.

BACKGROUND

Many containers are provided with tamper-resistant devices to resist refilling of contents in the containers. For example, a beverage container can include a fitment that renders the container non-refillable, so as to impede efforts to refill the container with inferior products. U.S. Pat. No. 3,399,811 illustrates a container of this type.

BRIEF SUMMARY OF THE DISCLOSURE

The present disclosure embodies a number of aspects that can be implemented separately from or in combination with each other.

An authenticity-indicating package in accordance with one aspect of the disclosure includes a package including a container, an ultraviolet (UV) light protector carried by the container, and a UV light responder carried by the container so that at least a portion thereof is protected by the protector from premature exposure to UV light. After removal of the UV light protector, the UV light responder is responsive to a predetermined schedule of UV light exposure so as to change in visual appearance within a predetermined time.

In accordance with another aspect of the disclosure, there is provided a container authenticator including a housing and a light source carried by the housing to apply a predetermined schedule of ultraviolet (UV) light, including a predetermined wavelength of light in a predetermined amount over a predetermined application time, so as to provoke a change in a UV light responder. The authenticator also includes a sensor carried by the housing to sense the change in the UV light responder, and a controller carried by the housing, and coupled to the light source to control the light source and coupled to the sensor to determine whether the sensed change in the UV light responder meets a predetermined UV light responder change specification. The authenticator further includes an indicator carried by the housing, coupled to the controller to receive a signal therefrom, and to indicate authenticity if the controller determines that the sensed change meets the predetermined UV light responder change specification.

In accordance with other aspects of the disclosure, there are provided related manufacturing and authentication methods.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1:
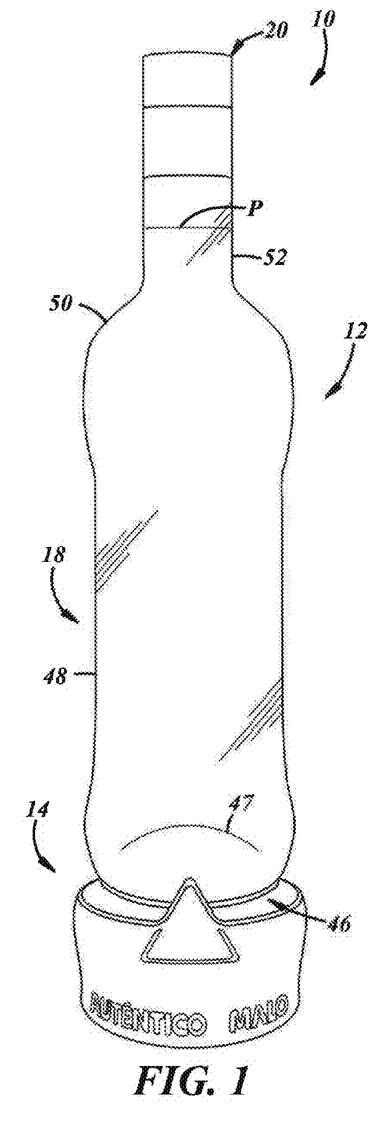
FIG. 1 is a perspective view of an illustrative embodiment of a package authentication system including a package being placed onto an authenticator.

FIG. 1 illustrates a package authentication system 10 including an authenticity-indicating package 12 and a package authenticator 14 for cooperation with the package 12, as described in further detail herein below. An object of the present disclosure, in accordance with one aspect thereof, is to enable a reliable indication of authenticity of the package 12 by rendering the package 12 responsive to a predetermined schedule of UV light exposure so that at least a portion of the package 12 changes in visual appearance within a predetermined time. The presently disclosed package 12 provides a temporal, quantitative, and qualitative indication of authenticity, as opposed to a merely binary (absence-presence) indication of authenticity. Accordingly, the presently disclosed authentication system 10 and package 12 provides an approach to package authentication that is more subtle and sophisticated than previous approaches and, thus, should render package refilling and/or counterfeiting more difficult.

Figure 1A:
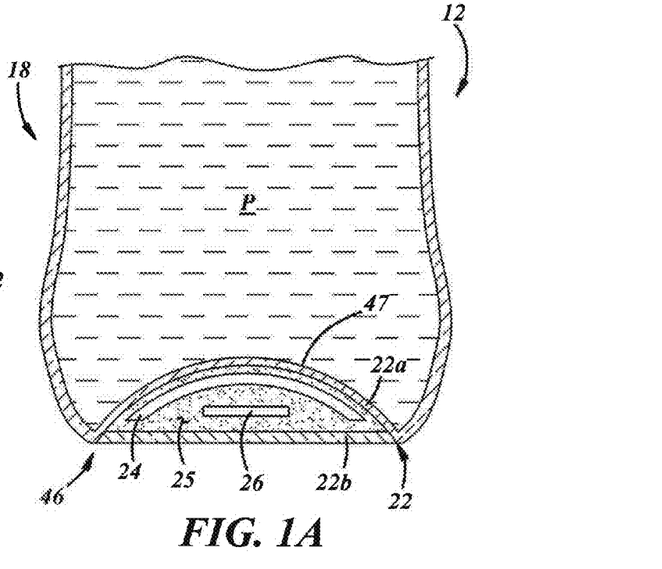
FIG. 1A is an enlarged, fragmentary, schematic view of a portion of the package of FIG. 1.
Figure 1B:
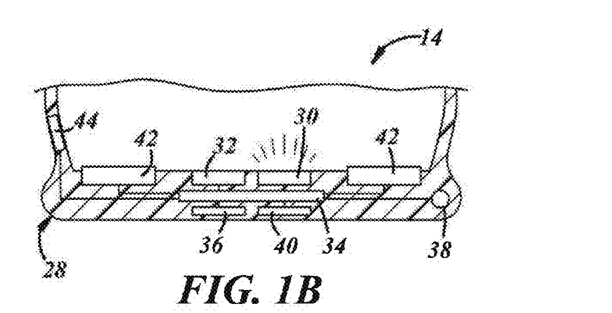
FIG. 1B is an enlarged, fragmentary, schematic view of a portion of the authenticator of FIG. 1.

The package 12 is presented in an original factory sealed state and including a container 18, a closure 20 for the container 18, and a dispensable product P carried in the container 18. With reference to FIG. 1A, the package 12 also includes an ultraviolet (UV) protector 22 carried by the container 18, and a UV light responder 24 responsive to ultraviolet (UV) light so as to change in appearance upon exposure thereto. The package 12 also may include a radio frequency identification (RFID) tag 26 carried by the container 18. With reference to FIG. 1B, the package authenticator 14 includes a housing 28, a light source 30 carried by the housing 28, a sensor 32 carried by the housing 28, a controller 34 carried by the housing 28 and coupled to the light source 30 and to the sensor 32, and an indicator 36 carried by the housing 28 and coupled to the controller 34 to indicate authenticity of the package 12 or lack thereof. The authenticator 14 also may include a power source 38, a switch 40, a weight scale 42, and/or an RFID interrogator 44 coupled to the controller 34.

With reference to FIG. 1, the container 18 may be of any suitable shape, and may include a jug, jar, bottle, other food or beverage container, or any other suitable container. The container 18 may be composed of glass and may be a beverage container including a bottom or base 46 that may include a push-up or punt 47, a body 48 extending from the base 46, a shoulder 50 extending from the body 48, and a neck 52 extending from the shoulder 50. The container 18 may be fabricated in press-and-blow, blow-and-blow, or hand blowing glass container manufacturing operations, or in any other suitable manner. The container 18 may be composed of plastic, metal or ceramic material.

The product P may include an authentic, genuine, or original material dispensably disposed within the container 18. For example, a product manufacturer may fill the container 18 with the authentic or original flowable product P at a filling or packaging plant or factory and close the container 18 with the closure 20, which may be coupled to the neck 52 of the container 18 by threading, plugging, or in any other suitable manner. The product P may include a liquid or flowable solid, for example, a beverage, for instance, beer, wine, liquor, soda, or any other suitable beverage or liquid, or a flowable food of any kind. In one example embodiment, the closure 20 may be sealed to the container neck 52 with wax, with a paper or plastic seal, with a portion of the closure 20 itself, with a tamper evidence band, or with any other suitable seal or the like (not separately shown). Accordingly, the package 12 leaves a filling or packaging plant in an original factory sealed condition. Thereafter, for example, after wholesale distribution or retail sale, the seal may be broken and the closure 20 removed to allow the product P to be dispensed out of the container 18 through the neck 52.

With respect to FIG. 1A, the ultraviolet (UV) light protector 22 may be carried by the container 18 in any suitable manner. As used herein, the phrase "carried by the container" includes carried in the container 18, carried on the container 18, coupled to the container 18, and the like. The UV light protector 22 may include any suitable UV blocking, UV absorbing, and/or UV retarding material or element of any kind. The UV light protector 22 may include an opaque element, for instance, an opaque sticker, label, appliqué, or the like. The UV light protector 22 may be part of the container composition itself, a coating on interior and/or exterior surfaces of a substrate of the container 18, or the like. For example, the UV light protector 22 may include vanadium, selenium, carbon, iron, other glass colorant materials or colored glass, and/or the like. In another embodiment, the UV light protector 22 may include the product P as a UV blocking medium carried by the container on the other side of the UV light responder 24 so that the responder 24 is protected from ambient UV light shining through the container 18 by the product P in the container 18. For example, some spirits, for instance, cognac, scotch whiskey, whiskey, and/or the like absorb much of the UV spectrum and can be used as the UV light protector. In any case, the UV light protector 22 may be provided over or around the UV light responder 24 to protect the responder 24 from exposure to UV light from outside the package. For instance, the UV light protector 22 may include a first portion 22a that may be applied to a bottom or external surface of the punt 47, and a second, removable portion 22b that may be applied to a bottom or external surface of the container 18. The removable portion 22b may be removed to allow the UV light responder 24 to be exposed to UV light. The removable portion 22b may be integrally fastened to the container 18, for instance, via threading, snap-fit, interference fit, or removably coupled in any other suitable manner.

The UV light responder 24 is responsive to the predetermined schedule of UV light to change or modify an optical or visual characteristic visible from outside the container 18. The change may be irreversible. The UV light responder 24 is carried by the container 18 so that at least an indicating portion thereof is protected by the UV light protector 22 from premature exposure to UV light and, after removal of the UV light protector 22, is exposed to UV light. The UV light responder 24 is carried, directly or indirectly, by the container 18. For example, the responder 24 may be embedded in a carrier 25 that may be non-removably coupled to the container 18 in any suitable manner. For example, the carrier 25 may be a transparent or translucent epoxy, sol gel adhesive, or any other commercially available adhesive with appropriate strength and temperature resistance. In any case, a portion of the responder 24 is protected by the UV-protective product P carried in the container 18 and/or the fixed portion 22a of the UV light protector 22, and by the removable portion 22b of the UV light protector 22 that may be carried on an outside of the container 18 over another portion of the responder 24. The responder 24 may be non-removably coupled to and carried by the base 46 of the container 18. The terminology "non-removably coupled" includes a manner in which an element is, by design-intent, not intended to be removed from the container 18 without damaging the container 18 and/or the element, or otherwise visibly compromising the structural and/or functional integrity of either or both.

The UV light responder 24 may include a photosensitive material and, more particularly, a photochromic material, or any other material or device suitably visibly responsive to UV light, so as to darken and/or change color upon exposure thereto. As used herein, the term "photosensitive" includes, by design intent, the properties of visible darkening after exposure to UV light. The photochromic material may include a metal halide material, which may include silver, copper, and/or cadmium with chlorine, bromine, and/or iodine halides. The photochromic material may include any suitable material selected from the group(s) consisting of the aforementioned materials, or from any other suitable photochromic material(s). In one example, a substrate of the container 18 may be coated with a photochromic coating. In a further example, the container 18 may carry a separate photochromic component. The photochromic material provides a counterfeit deterrence feature that provides evidence that the original package 12 is authentic.

The RFID tag 26 may be responsive to radio frequency interrogation to transmit an activation signal usable by a controller 34 for activation of the UV light source 30 of the authenticator 14 (FIG. 1B) that generates the predetermined schedule of UV light. The tag 26 may be carried by the container 18 in any suitable manner, for example, in the carrier 25 that may be non-removably coupled to the container 18. The RFID tag 26 may be any commercially available UHF or VHF frequency tag.

With respect to FIG. 1B, the authenticator housing 28 may include a pedestal-like construction that may be adapted to receive the base 46 of the container 12 (FIG. 1A). The housing 28 may be composed of plastic, glass, metal or any other material suitable to carry the container 12.

The authenticator light source 30 includes a UV light source to apply a predetermined schedule of ultraviolet (UV) light to the package 12. The UV light used to darken the photochromic material preferably includes UVA and all ranges and subranges thereof, Near UV and all ranges and subranges thereof, or, more particularly, UV light greater than about 360 nm. The UV light 30 may include one or more UV light emitting diodes (LEDs), or any other suitable source(s) of UV light. In one embodiment, the light source 30 may emit light between 360 and 390 nm wavelength and all subranges therebetween and, more particularly between 365 and 385 nm wavelength and all subranges therebetween, or any other suitable wavelength.

The authenticator sensor 32 may be responsive to a change in the UV light responder 24 and is in communication with the controller 34. For example, the sensor 32 may include a CCD, CMOS, or any other suitable type of optical sensor. The sensor 32 may capture images of the UV light responder 24 intermittently, continuously, and/or upon instructions from the controller 34.

The authenticator controller 34 controls the light source 30 and interprets input from the sensor 32. The controller 34 applies the UV light schedule to the light source 30, which light schedule includes a predetermined wavelength of light in a predetermined amount over a predetermined application time, so as to provoke a specific change in the UV light responder 24 of the package 12 (FIG. 1). The controller 34 determines whether the sensed change in the UV light responder 24 meets a predetermined UV light responder change specification. The UV light responder 24 is responsive to the predetermined schedule of UV light exposure so as to change in visual appearance within a predetermined time to a predetermined amount/degree and according to a predetermined quality. The change may be irreversible. When first exposed to the UV light source, the responder may be transparent or at least translucent, transmitting more than 80% of the light from the light source. Depending upon the desired response time, with continued exposure to the light source, the responder may transmit approximately 30% of the light. For example, the responder could be set to change from a light transmitter to a light blocker in approximately 1 minute after activation. In other words, the package 12 may be permanently or irreversibly tagged as being an authentic package 12. Although not separately shown, the controller 34 may include memory, one or more processors coupled to the memory, and one or more interfaces coupled to the processor. Of course, the controller 34 further may include or be coupled to any ancillary devices, for example, clocks, internal power supplies, and the like. An example of a controller that could be used is the PIC10F200 by Microchip Technologies.

Figure 2:
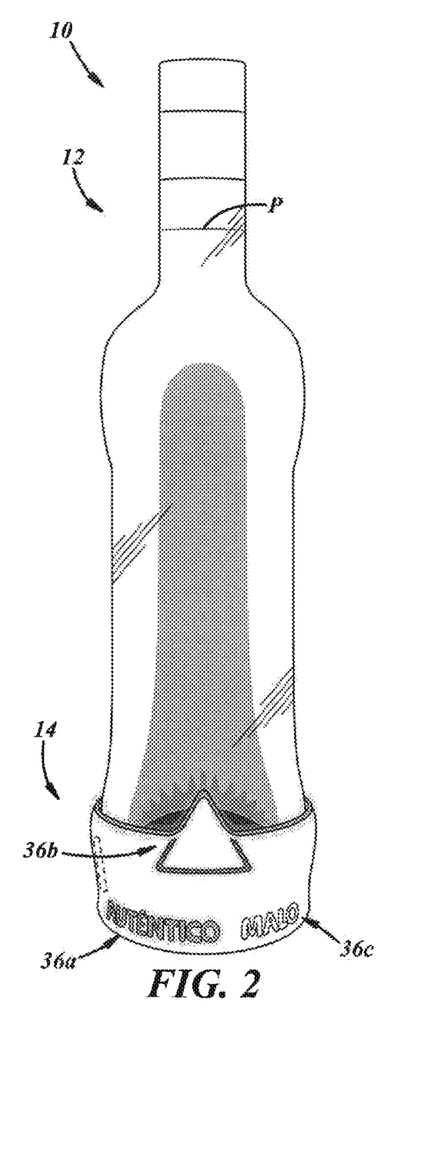
FIG. 2 is a perspective view of the system of FIG. 1, demonstrating operation when the authenticator determines the package to be authentic.
Figure 3:
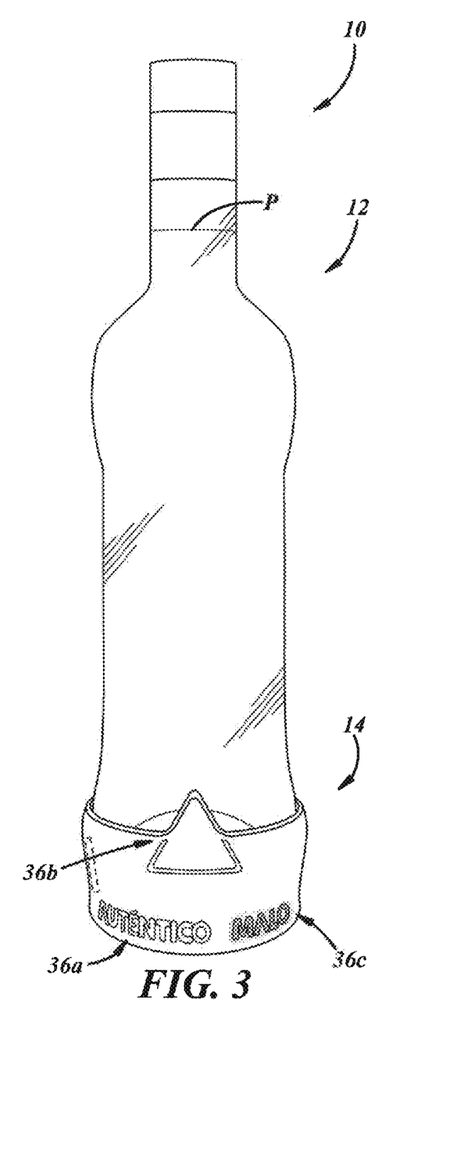
FIG. 3 is a perspective view of the system of FIG. 1, demonstrating operation when the authenticator determines the package to be counterfeit.

The indicator 36 is coupled to the controller 34 to receive signals therefrom, and to indicate authenticity if the controller 34 determines that the sensed change meets the predetermined UV light responder change specification. The indicator 36 may include one or more lights or light displays that may include one or more authentication portions 36a, 36b that may be textual and/or graphical and may be activated when the package 12 is determined to be authentic as shown in FIG. 2, and a counterfeit-indicating portion 36c of the light display that may be activated if no change in the UV light responder 24 is detected or a change in the UV light responder 24 is not indicative of authenticity as shown in FIG. 3.

The power source 38 may provide or communicate power to the authentication system 10 and may include one or more batteries, quartz piezoelectrics, capacitors, solar cells, an AC or DC connector, a transformer, or any other suitable supply of electricity.

The switch 40 may enable activation of the system 10 and may include or an automatic proximity sensor, or a manual on/off switch, for instance, a manual toggle switch, dip switch, or any other suitable type of switch to power on or power off the authenticator 14.

The weight scale 42 may include a piezoelectric sensor, strain gage, or any other suitable scale to measure the weight of the package 12. The controller 34 may use the measured weight to help with its determination of authenticity of the package 12. For example, the light source 30 may be activated when the controller 34 determines that the sensed weight is indicative of authenticity, for instance, by being within a weight range expected for the package 12.

The RFID interrogator 44 may be in communication with the controller 34 of the authenticator 14, and with the RFID tag 26 of the package 12. When the RFID tag 26 of the package 12 is within operative proximity of the interrogator 44 of the authenticator 14, the interrogator 44 will interrogate the RFID tag 26 to receive data therefrom, which data may include an identification or serial number or the like. The RFID tag data may be in communication with the controller 34, which determines whether or not the RFID tag is authentic. For example, the controller may access a database of authentic ID numbers, for instance, through a connection to a website on the internet, or the controller may look up an encrypted ID to determine whether that ID has been previously checked or whether the package 12 with that ID has been purchased previously; in such instance, if the package had been purchased previously, the authenticator 14 would indicate that the package 12 or the product P is not authentic.

FIGS. 4-7 show another illustrative embodiment of an authentication system 110 including an authenticity-indicating package 112 and an authenticator 114 for cooperation with the package 112. This embodiment is similar in many respects to the embodiment of FIGS. 1-3 and like numerals among the embodiments generally designate like or corresponding elements throughout the several views of the drawing figures. Accordingly, the descriptions of the embodiments are incorporated into one another, and description of subject matter common to the embodiments generally may not be repeated here.

Figure 4:
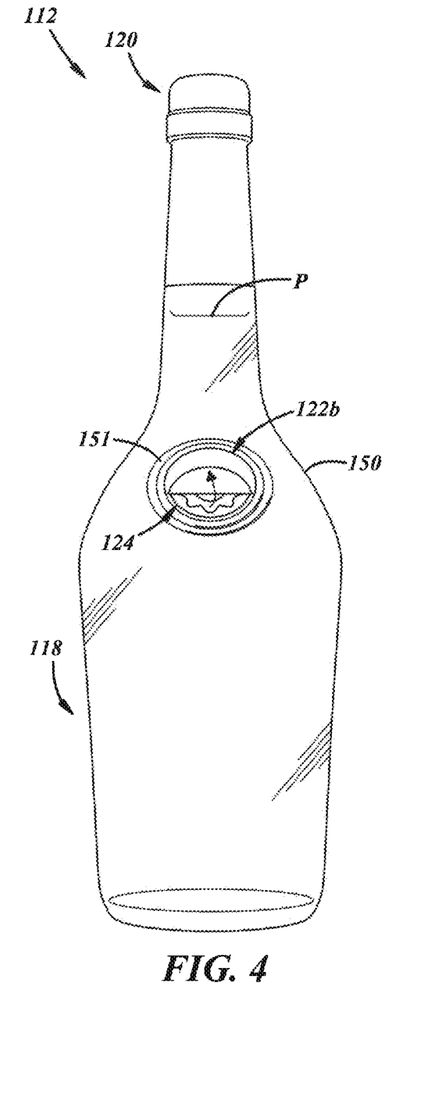
FIG. 4 is a perspective view of a package in accordance with another illustrative embodiment of the present disclosure, and illustrating an ultraviolet (UV) light protector being removed from a UV light responder of the package.

FIG. 4 illustrates a package 112 including a glass container 118, a closure 120 coupled to the container 118, a dispensable product P carried in the container 118, a UV light responder 124 carried by the container 118, and a UV light protector 122b being removed from the UV light responder 124. In this embodiment, the UV light responder 124 is carried on a shoulder 150 of the container 118 and, more particularly, within a pocket 151 of the shoulder 150.

Figure 5:
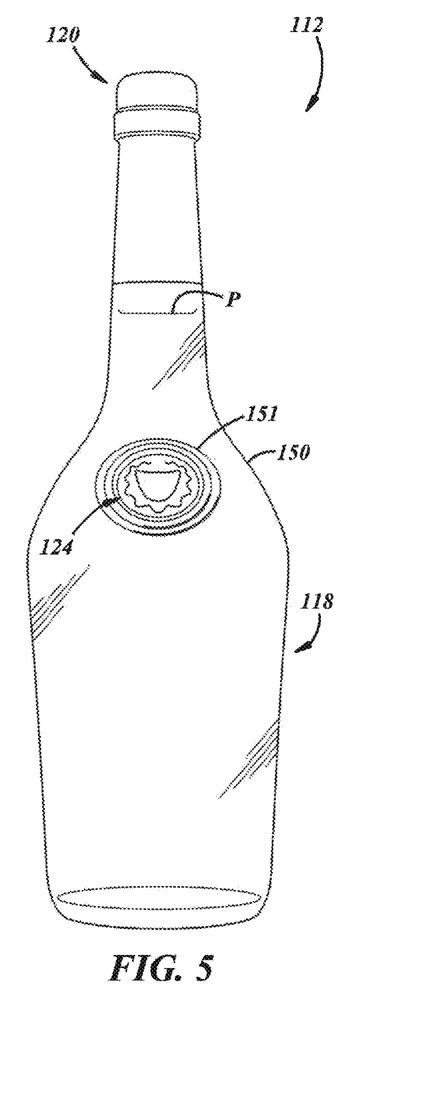
FIG. 5 is a perspective view of the package of FIG. 4, without the UV light protector.

FIG. 5 illustrates the UV light responder 124 completely exposed on a portion thereof after removal of the UV light protector 122 shown in FIG. 5. Of course, other portions of the responder 124 may be protected by the product P carried in the container 118, by other UV light protectors carried by the container 118, or the like.

Figure 6:
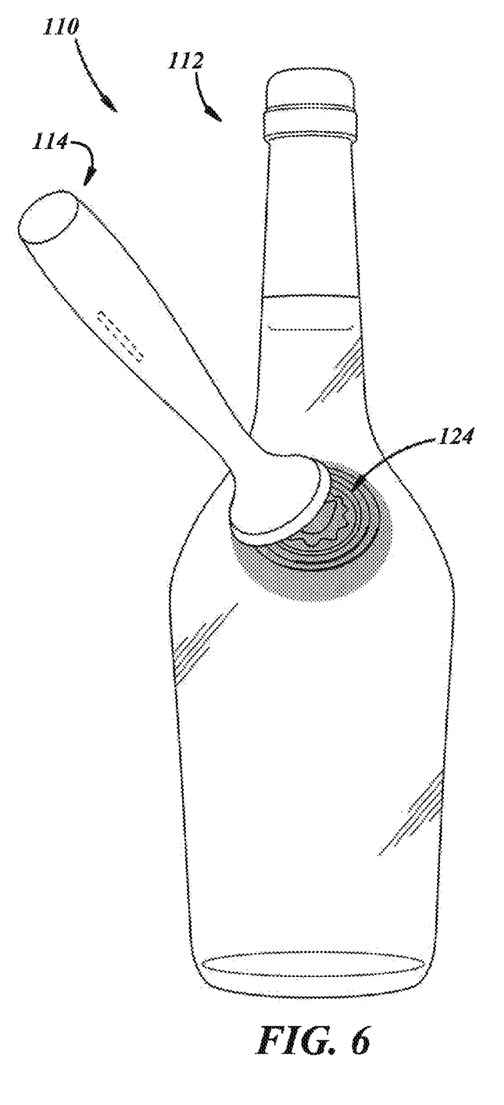
FIG. 6 is a perspective view of an illustrative embodiment of an authentication system including an authenticator interacting with the package of FIG. 5.
Figure 7:
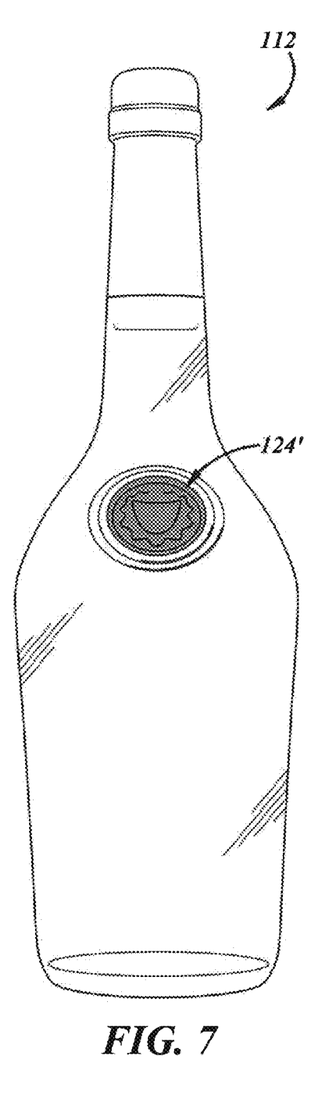
FIG. 7 is a perspective view of the package of FIG. 4, wherein the UV light responder demonstrates authenticity.

FIG. 6 illustrates an authenticator 114 cooperating with the UV light responder 124. The authenticator 114 may be substantially similar to, and a hand-held or wand version of, the authenticator 14 of the embodiment of FIGS. 1-3, except for the weight scale. Also, the authenticator 114 may or may not include the sensor 32 and the indicator 36 of the authenticator 14 of FIGS. 1-3. Instead, as illustrated by FIGS. 6 and 7, when the UV light responder 125 is exposed to the authenticator 114, the authenticator 114 may simply provoke a change in the UV light responder 124 as shown by the changed UV light responder 124' in FIG. 7 and leave it to an observer to determine whether or not the change is indicative of authenticity of the package 112. For example, if the change occurs within a predetermined application time, then an observer may deem the package 112 to be authentic. If, however, the change occurs too fast or too slow, then an observer may deem the package 112 to be counterfeit. It is anticipated that various forms of advertising may be used to educate the consumer in the use of the authentication device, including responder changes and/or change times that indicate authenticity.

In accordance with one or more of the embodiments described above, a method of authenticating a package including a glass container may include the following steps.

lighting a UV light responder of the package with a predetermined schedule of UV light, including a predetermined wavelength of light in a predetermined amount over a predetermined application time, so as to provoke in the UV light responder a change in visual appearance;

sensing the change in the UV light responder;

determining whether the change in the UV light responder meets a predetermined UV light responder change specification; and     indicating authenticity if it is determined that the change meets the predetermined UV light responder change specification.

The method also may include interrogating a radio frequency identification (RFID) tag carried by the container, wherein the lighting step is carried out after the RFID tag is recognized as authentic.

There thus has been disclosed an authentication system, package, product, apparatus, and/or method that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. An authenticity-indicating package, comprising:
    a container;
    an ultraviolet (UV) light protector carried by the container; and
    a UV light responder carried by the container so that at least a portion thereof is protected by the protector from premature exposure to UV light, and, after removal of the UV light protector, the UV light responder is responsive to a predetermined schedule of UV light exposure so as to change in visual appearance within a predetermined time.

2. The package set forth in claim 1, wherein the predetermined schedule includes a predetermined wavelength of UV light applied in a predetermined amount and over a predetermined application time.

3. The package set forth in claim 1, further comprising:
    a radio frequency identification (RFID) tag carried by the container and responsive to radio frequency interrogation to transmit an activation signal usable by a controller and a container UV light source that cooperate to provide UV light according to the predetermined schedule.

4. The package set forth in claim 1, wherein the responder is non-removably coupled to and carried in a punt of the container, and covered by a removable portion of the UV light protector carried on an outside of the container over a portion of the responder, and wherein a UV blocking medium is carried by the container over another portion of the UV light responder.

5. The package set forth in claim 1, wherein the responder is carried on a shoulder of the container, between a body and a neck of the container.

6. The package set forth in claim 1, wherein the responder irreversibly changes in appearance.

7. An authentication system comprising:
    the package set forth in claim 1; and
    a container authenticator, including:
        a housing;
        a light source carried by the housing to apply a predetermined schedule of ultraviolet (UV) light, including a predetermined wavelength of light in a predetermined amount over a predetermined application time, so as to provoke a change in a UV light responder;
        a sensor carried by the housing to sense the change in the UV light responder;
        a controller carried by the housing, and coupled to the light source to control the light source and coupled to the sensor to determine whether the sensed change in the UV light responder meets a predetermined UV light responder change specification; and
        an indicator carried by the housing, coupled to the controller to receive a signal therefrom, and to indicate authenticity if the controller determines that the sensed change meets the predetermined UV light responder change specification.

8. A container authenticator, comprising:
    a housing;
    a light source carried by the housing to apply a predetermined schedule of ultraviolet (UV) light, including a predetermined wavelength of light in a predetermined amount over a predetermined application time, so as to provoke a change in a UV light responder;
    a sensor carried by the housing to sense the change in the UV light responder;
    a controller carried by the housing, and coupled to the light source to control the light source and coupled to the sensor to determine whether the sensed change in the UV light responder meets a predetermined UV light responder change specification; and
    an indicator carried by the housing, coupled to the controller to receive a signal therefrom, and to indicate authenticity if the controller determines that the sensed change meets the predetermined UV light responder change specification.

9. The authenticator set forth in claim 8, wherein the predetermined UV light responder change specification includes a predetermined quantity and quality of change in appearance within a predetermined authentication period.

10. The authenticator set forth in claim 8, further comprising:
    a radio frequency identification (RFID) reader non-removably carried by the housing to read an RFID tag carried by the container,
    wherein the light source is activated when the RFID tag is recognized as authentic.

11. The authenticator set forth in claim 8, wherein the housing includes a pedestal on which the base of the container is restable.

12. The authenticator of claim 8, wherein the housing carries the container and includes a weight scale to sense a weight of the container, wherein the light source is activated when the weight is indicative of authenticity.

13. The authenticator set forth in claim 8, wherein the housing includes a wand, and a switch carried by the wand to connect the light source to the power source.

14. The authenticator of claim 13, wherein the switch includes a manual on/off switch or an automatic proximity sensor.

15. The authenticator of claim 8, wherein the indicator is a light display having an authentication portion that is activated when the container is determined to be authentic.

16. The authenticator of claim 15, wherein if no change in the UV light responder is detected or a change in the UV light responder is not indicative of authenticity, then the light display is not activated.

17. The authenticator of claim 15, wherein if no change in the UV light responder is detected or a change in the UV light responder is not indicative of authenticity, then a counterfeit-indicating portion of the light display is activated.

18. A system including the authenticator of claim 8, and a container carrying an authentic UV light responder that is responsive to the applied predetermined schedule of UV light in a manner that indicates authenticity to a person viewing the authentic UV light responder.

19. A method of authenticating a package including a container, comprising the steps of:
- lighting a UV light responder of the package with a predetermined schedule of UV light, including a predetermined wavelength of light in a predetermined amount over a predetermined application time, so as to provoke in the UV light responder a change in visual appearance;
- sensing the change in the UV light responder;
- determining whether the change in the UV light responder meets a predetermined UV light responder change specification; and
- indicating authenticity if it is determined that the change meets the predetermined UV light responder change specification.

20. The method of claim 19, further comprising the step of:
- interrogating a radio frequency identification (RFID) tag carried by the container; and
- wherein the lighting step is carried out only if the RFID tag is recognized as authentic.

* * * * *